(12) United States Patent
Ota

(10) Patent No.: US 6,414,927 B1
(45) Date of Patent: Jul. 2, 2002

(54) DISK LOADING APPARATUS

(75) Inventor: Hidehiko Ota, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/787,756

(22) PCT Filed: Aug. 17, 2000

(86) PCT No.: PCT/JP00/05492

§ 371 (c)(1),
(2), (4) Date: May 22, 2001

(87) PCT Pub. No.: WO01/15158

PCT Pub. Date: Jan. 3, 2001

(30) Foreign Application Priority Data

Aug. 19, 1999 (JP) .............................................. 11-232932

(51) Int. Cl.[7] .................................................. G11B 3/90
(52) U.S. Cl. .................................. 369/53.41; 369/53.43
(58) Field of Search ............................... 369/53.2, 53.3,
369/53.41, 53.43, 75.1, 76, 77.1, 75.2

(56) References Cited

U.S. PATENT DOCUMENTS 5,719,844 A * 2/1998 Abe .......................... 369/77.1
5,828,641 A * 10/1998 Abe et al. .................. 369/75.1

FOREIGN PATENT DOCUMENTS

JP    10-116459    5/1998
JP    2000-315349  11/2000

* cited by examiner

Primary Examiner—Paul W. Huber
(74) Attorney, Agent, or Firm—McDermott, Will & Emery

(57) ABSTRACT

A disk loading apparatus is provided which stops disks, even if the disks have different diameters, when disk center holes have been ejected to the substantially same positions out of an apparatus body during the ejection. The disks can be pulled out without soiling a recording surface of the disk. One disk-pass detecting switch detects a pass of the last end of each disk and discriminates sizes of the disks. In addition, a rotation time of a roller after the detection of the pass is controlled depending on disk diameters.

7 Claims, 3 Drawing Sheets

DISK LOADING APPARATUS

TECHNICAL FIELD

The present invention relates to a disk loading apparatus for a recording/reproducing apparatus using a disk-shaped recording medium (it is hereinafter called a disk) such as a compact disk (CD).

BACKGROUND ART

Conventional disk loading apparatuses are shown in FIG. 2 and FIG. 3. In the apparatuses, large-diameter disk 1, small-diameter disk 2, disk-driving roller 3, disk-pass detecting switch 4 for detecting for the end of the disk to pass over, and apparatus body 5 are illustrated. When the disk is ejected, disk-pass detecting switch 4 detects that the disk has passed. The disk then stops at a position shown in FIG. 2.

Even if each of large-diameter (12 cm) disk 1 or small-diameter (8 cm) disk 2 is used, the disk stops with a same mechanism regardless of the diameters. As shown in FIG. 2, if large-diameter disk 1 stopped and is securely held at a position where the disk can be pulled out with a user's finger inserted into a center hole, a projecting portion of small-diameter disk 2 is so small that the center hole of small-diameter disk 2 cannot move out of apparatus body 5. Therefore, a recording area of small-diameter disk 2 is grabbed with the finger. While, as shown in FIG. 3, if the center hole of small-diameter disk 2 lies off apparatus body 5 to be pulled out, a projecting portion of large-diameter disk 1 becomes excessively so large that the disk cannot be held stably in the projecting state.

DISCLOSURE OF THE INVENTION

It is an object of the present invention to eject large and small disks from an apparatus body at substantially equal projecting rates using one common disk-pass detecting switch, so as to prevent a disk surface from getting soiled or damaged.

A disk loading apparatus of the present invention, in response to a size discrimination result of the used disks of different diameters, controls rotation time of a roller after the detection of the pass of each ejected disk's last end to control the ejected amounts of the disks.

DETAILED DESCRIPTION OF THE PREFERRED EMBODIMENT

Figure 1:
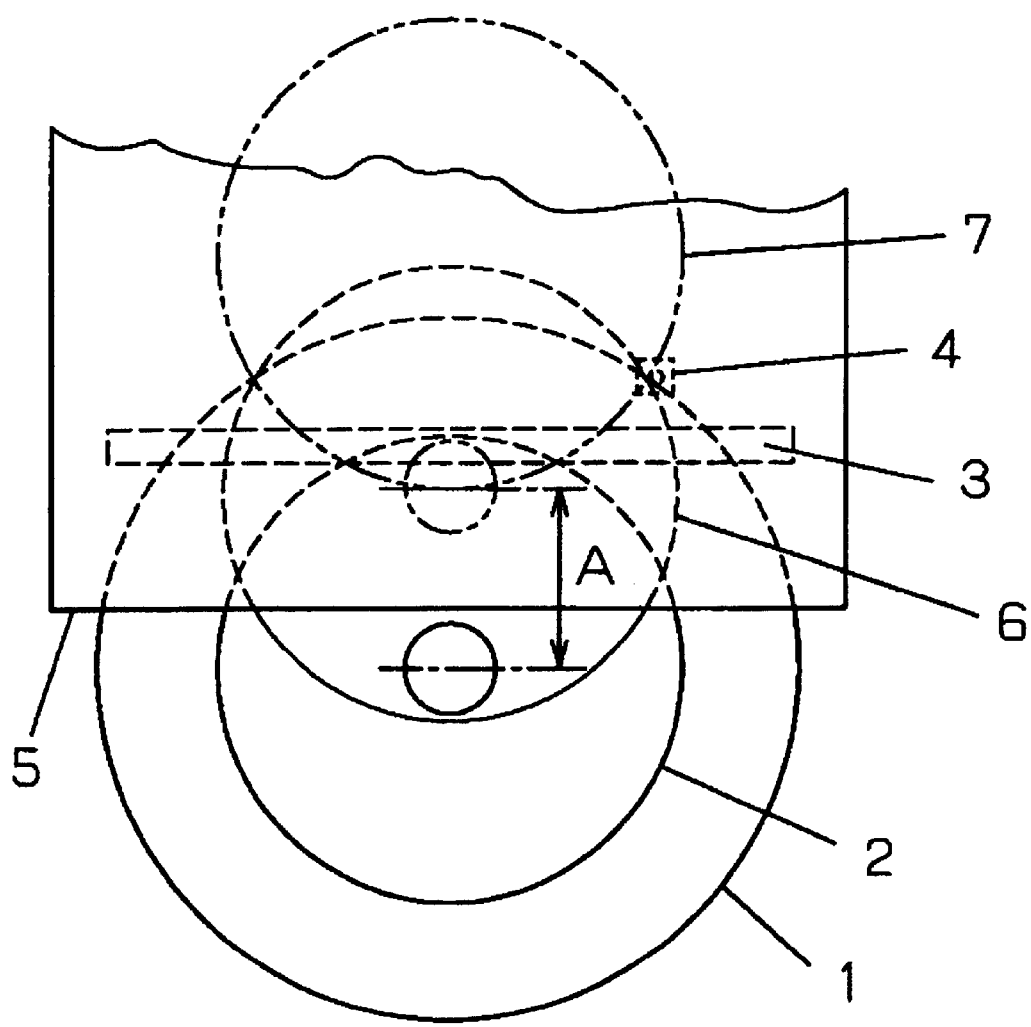
FIG. 1 is a top view of a main part of a disk loading apparatus in accordance with an exemplary embodiment of the present invention.
Figure 2:
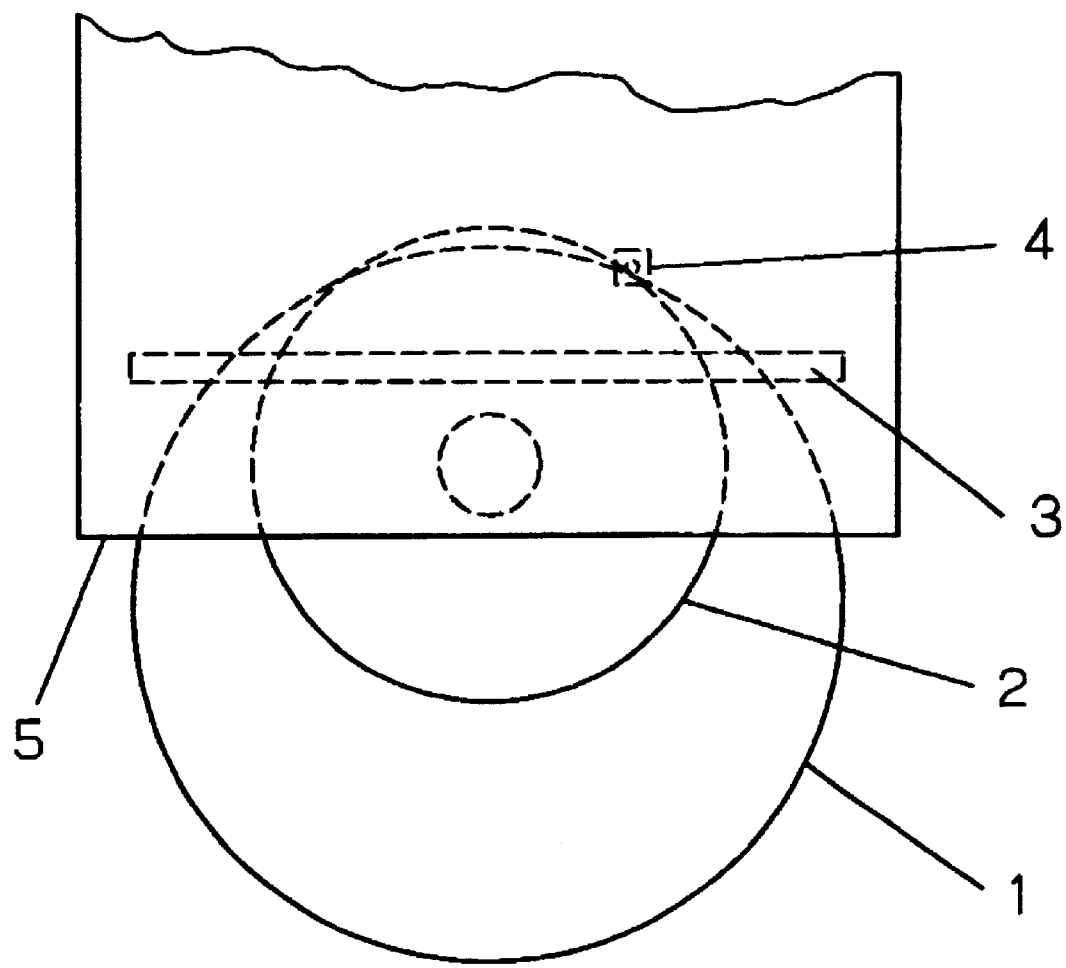
FIG. 2 is a top view of a main part of a conventional disk loading apparatus.
Figure 3:
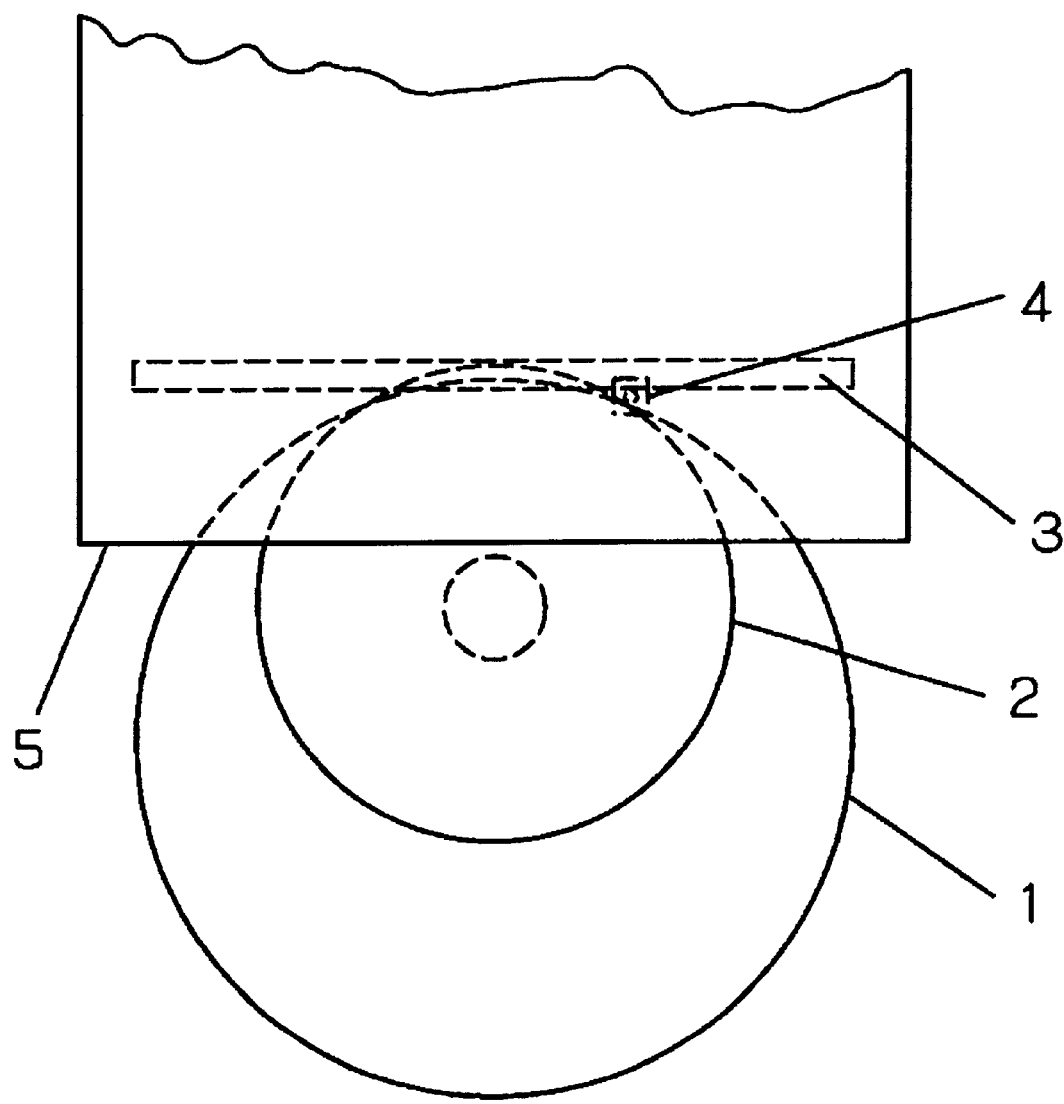
FIG. 3 is a top view of a main part of another conventional disk loading apparatus.

FIG. 1 shows a disk loading apparatus in accordance with an embodiment of the present invention. The same elements used in FIG. 2 are denoted with the same reference numerals. FIG. 1 illustrates position 6 where that small-diameter disk 2 has passed is detected during ejected, and position 7 where small-diameter disk 2 is set on a turntable (not shown). When large-diameter disk 1 is ejected from the apparatus, roller 3 is stopped just after disk-pass detecting switch 4 detects that large-diameter disk 1 has passed. Then the disk is stopped and held with its center hole projecting from apparatus body 5. When small-diameter disk 2 is ejected, roller 3 is not immediately stopped after the passing is detected but is driven for a certain time. After small-diameter disk 2 is ejected by distance A, roller 3 is stopped driving. Therefore, small-diameter disk 2 is also held with its center hole projecting from apparatus body 5 as similarly to large-diameter disk 1. As a result, a user can insert his/her fingertips into the center hole to pull out small-diameter disk 2. Distance A is determined depending upon an installation position of disk-pass detecting switch. Time T by which roller 3 is delayed to stop is calculated by T=A/V, where velocity V is a disk ejecting velocity of roller 3. Time T may be stored in a memory for use.

a size of the disk is discriminated based on the following factor:
1) A period from a time when the disk starts passing over disk-pass detecting switch 4 to a time when the disk has been pulled in;
2) A period from the start of ejecting the disk to a time when disk-pass detecting switch 4 is operated;
3) A period during the disk rotates at a predetermined speed from starting to rotate on a turntable; or
4) A fact that small-diameter disk 2 passes over disk-pass detecting switch 4 at position 7 from position 6 where disk 2 start to pass, but large-diameter disk 1 does not pass over it.

INDUSTRIAL APPLICABILITY

A disk loading apparatus for a recording/reproducing apparatus using a disk-like recording medium such as a CD stops the disk with its center hole projecting from an apparatus body when ejecting it even if each of disks of different diameters are used. Accordingly, soil, damage, fall, and unstable holding of the disks are prevented. The size of the disk can be discriminated with using only one disk-pass detecting switch, so that a structure of the loading apparatus can be simplified.

What is claimed is:

1. A disk loading apparatus comprising:

a roller for pulling in and ejecting a disk;

a disk-pass detecting switch for detecting a pass of the disk when the disk is ejected;

disk discriminating means for discriminating a size of the disk; and a controller for controlling, in responsive to a discrimination result by said disk discriminating means, an operation time of said roller after the pass of the disk during ejected is detected.

2. The disk loading apparatus according to claim 1, wherein disks having center holes of various sizes are ejected out of said disk loading apparatus by substantially same distances.

3. The disk loading apparatus according to claim 1, wherein the disks are stopped ejecting when the center holes of the disks out of said disk loading apparatus.

4. The disk loading apparatus according to claim 1, wherein said disk-pass detecting switch is also used for discriminating the size of the disk.

5. The disk loading apparatus according to claim 4, wherein the size of the disk is discriminated based on a period from a time when the disk starts passing over said disk-pass detecting switch to a time when the disk is pulled in.

6. The disk loading apparatus according to claim 4, wherein the size of the disk is discriminated based on a period from a time when the disk starts to be ejected to a time when said disk-pass detecting switch detects a pass of the disk.

7. The disk loading apparatus according to claim 2, wherein the disks are stopped ejecting when the center holes of the disks out of said disk loading apparatus.

* * * * *